UNITED STATES PATENT OFFICE.

CYRUS M. WARREN, OF BROOKLINE, MASSACHUSETTS.

ROOFING AND PAVING MATERIAL.

SPECIFICATION forming part of Letters Patent No. 227,080, dated April 27, 1880.

Application filed July 7, 1879.

*To all whom it may concern:*

Be it known that I, CYRUS M. WARREN, of Brookline, in the county of Norfolk and State of Massachusetts, have invented a new and Improved Roofing and Paving Material, which invention is fully described in the following specification.

The object of this invention is to provide a roofing and paving material at a moderate cost, which shall be tough and elastic at comparatively low temperatures, and yet free from liability to dry and become brittle on exposure to the sun, similar in this respect to roofing and paving cements made of natural asphaltum and petroleum residuum, but less expensive, and differing from the ordinary coal-tar roofing and paving cements, which, even when new, are mostly brittle at low temperatures, and gradually but permanently lose on exposure what toughness they may have at higher temperatures.

The invention consists in a roofing and paving material formed by fusing together in any suitable proportions a compound of proper consistency made of coal-tar residuum or other equivalent material, such as rosin or resinous pitch and wax tailings, (or other equivalent non-volatile material, as candle-tar, fat or fat-oil, neutralized acid tar, or other substance having similar non-volatile properties, such as are produced either as a residuum or distilled product at a suitably high temperature at or near the end of the distillation of natural bitumens, bituminous coals, bituminous shales, bituminous schists, or other substances yielding hydrocarbon oils by distillation, or at or near the end of the redistillation of such oils, or the residuums of the same at a high temperature,) and a compound of suitable consistency made of natural bitumen or asphaltum and petroleum residuum, wax tailings, or other equivalent non-volatile softening material, such as above described, (or a soft natural bitumen of suitable consistency may be substituted for the latter compound where such can be obtained at a reasonable cost,) tempering the mixture to any desired consistency with wax tailings or other equivalent material, or, if too soft, temper by melting in a hard asphaltum or hard coal-tar residuum, as may be required, these being matters that will be readily understood and applied by persons skilled in the manufacture of cements of this class.

Instead of preparing the above-described compounds separately before mixing, it will be equivalent, and at times may be more convenient, to melt together directly in suitable proportions all the ingredients thereof; or the asphaltum may first be fused with a suitable proportion of petroleum residuum, wax tailings, or other equivalent material, preferably sufficient to give to it about the consistency required for the roofing or paving cement, as the case may be, and then melt in the coal-tar residuum or other equivalent material in suitable proportion, and finally temper the mixture to the required consistency with wax tailings or other equivalent solvent and non-volatile material, agitating thoroughly from time to time to produce a homogeneous mixture—matters also that will be readily understood and applied by persons skilled in the art of manufacturing cements of this class.

In carrying out my invention I prefer to use a hard coal-tar residuum, or equivalent hard material, instead of that of a pitchy consistency, in order that, by substitution, all of the softening materials of the new compound may be of the non-volatile nature above described; but the soft or pitchy residuums, although not so good, may be employed with proportionally improved results.

Instead of using the ordinary coal-tar residuum above described in compounding my new asphaltic cement, the new compound residuums resulting from the distillation of mixtures of either coal-tar or coal-tar pitch and wax tailings or petroleum residuum, respectively described in my specification filed November 25, 1878, and in my specification, Case D, of even date with this application, respectively, may be employed; and notwithstanding their somewhat higher cost, the compound residuums here referred to may be preferable in some respects, viz: first, on account of the fact that the coal-tar oils have been more completely eliminated therefrom than would be possible by simple distillation of the coal-tar pitch by itself, and at the same time preserve the fusibility of the residuum; and, second, as a consequence of such more complete elimination, that the new asphaltic cement made with either of the compound residuums as an ingredient will emit, on being reheated for use, no perceptible characteristic odor of coal-tar material.

To compound either a roofing or a paving cement from the two kinds of cement above described, I prefer to mix, by melting together with agitation, one part of the cement (roofing or paving cement, as may be required) made of coal-tar residuum or other equivalent material and wax tailings, or other equivalent solvent and non-volatile material, and three (3) parts of the cement of the same consistency, made of natural asphaltum and wax tailings or petroleum residuum or other equivalent material which will produce a composite roofing or paving cement, as the case may be, of about the same consistency as those from which it is compounded, and that will compare favorably, as to its toughness and elasticity at low temperatures, with the best cements composed entirely of natural asphaltum and petroleum residuum or wax tailings, but considerably less expensive.

I do not limit myself to the proportions above stated, nor to any process described, since these may be varied to advantage within the scope of my invention to adapt them to the requirements of different localities, climates, or purposes.

I claim as my invention—

A roofing and paving material composed of coal-tar residuum, with or without an admixture of still-wax or wax cokings and liquid wax tailings, or other equivalent solvent and non-volatile material, and natural bitumen or asphaltum, with or without an admixture of petroleum residuum or other equivalent softening and non-volatile material, substantially as set forth.

CYRUS M. WARREN.

Witnesses:
ALLEN LINCOLN,
THOS. J. HIND.